Patented July 27, 1937

2,087,986

UNITED STATES PATENT OFFICE 2,087,986

PREPARATION OF 4-ALKYL HALO-PHENOLS

Lindley E. Mills, Midland, Mich., assignor to The Dow Chemical Company, Midland, Mich., a corporation of Michigan No Drawing. Original applications February 3, 1933, Serial No. 655,086, and October 29, 1934, Serial No. 750,598. Divided and this application June 27, 1936, Serial No. 87,763

2 Claims. (Cl. 260—154)

The present invention relates to a new class of compounds, namely, the 4-alkyl-halo-phenols, wherein the substituting alkyl group contains more than five carbon atoms; and this application is concerned more particularly with a process of producing such compounds.

I have prepared compounds of the aforementioned class, determined certain physical properties thereof whereby they may be readily identified, and found that they have high phenol coefficients and may advantageously be used for various purposes, for example as antiseptics and germicides. It is the object of this invention particularly to provide a process for the preparation of these valuable new compounds. The invention, then, consists of the process hereinafter fully described and particularly pointed out in the claims.

The preparation of these new compounds can be accomplished by treating 4-alkyl substituted phenol, containing more than 5 carbon atoms in the alkyl group, directly with a halogen, thereby to replace at least one of the hydrogen atoms with said halogen. For example, such a phenol is placed in a closed reactor, preferably provided with an agitator, a halogen inlet, and an outlet suitable for the removal of the hydrogen halide gas formed during the course of the reaction. The phenol is heated above the melting point, usually between about 20° and about 150° C., if the material is normally a solid, and halogen then introduced below the surface of the liquid. A solvent for the phenol, which is not halogenated under the conditions of the reaction, may be used if desired. Among the solvents I have found suitable for use is carbon tetrachloride. The halogen may be added to the reaction mixture in any convenient manner; for instance, if the halogen is chlorine it may be bubbled through the reaction mixture, while in the case of bromine it can be dropped upon the surface or introduced below the surface of the mixture. After the desired amount of halogen has been introduced into the reactor, the reaction mixture is blown with air to insure removal of any small amounts of hydrogen halide remaining therein. The 4-alkyl halo-phenol product can then be separated from the reaction product by fractional distillation, preferably in vacuo, or the product may simply be allowed to cool, if the compound produced will crystallize from the solution. When the halo-phenol produced is solid at room temperature, the use of a solvent permits the halogenation to be effected at low temperature. This in turn benefits the yield of the halo-phenol, since at lower temperatures there is less formation of tar and other undesirable products such as higher halogenated phenols.

The following examples illustrate in detail my process for the preparation of 4-alkyl substituted halo-phenols wherein the substituting alkyl group contains more than 5 carbon atoms:

Example 1

In a reactor provided with an agitator was placed 176 grams of 4-cyclohexyl-phenol. The phenol was melted by heating to a temperature of about 130° C., and 160 grams of bromine was introduced slowly below the surface of the molten compound. The reaction mixture was heated to maintain it liquid throughout the bromination. After the reaction was completed the product was blown with air to remove a slight amount of hydrogen bromide remaining therein, and then fractionated in vacuo. The first fraction, distilling over up to 163° C. at 10 millimeters absolute mercury pressure, amounted to 9.5 grams. The second fraction of 111.0 grams, boiling between 163° and 168° C. at the same pressure, was substantially pure 4-cyclohexyl-2-bromo-phenol. The third fraction, distilling above 168° C., amounted to 65.5 grams and was found to contain considerable quantities of 4-cyclohexyl-2,6-dibromo-phenol. The middle fraction of 4-cyclohexyl-2-bromo-phenol was re-fractionated at 3 millimeters absolute mercury pressure, and pure 4-cyclohexyl-2-bromo-phenol boiling at 130°–132° C. under 3 millimeters absolute pressure was obtained. The compound is a colorless viscous liquid having a specific gravity of 1.356 compared to water at 15° C., and having a phenol coefficient of 5.5. The 4-cyclohexyl-2,6-dibromo-phenol separated from the third fraction had a specific gravity of 1.667 at 15°/15° C., and a boiling point of 178° C. at 3 millimeters.

4-cyclohexyl-2-chlorophenol, prepared according to the same method as above outlined for the preparation of 4-cyclohexyl-2-bromo-phenol, using chlorine as the halogenating agent, has a specific gravity of 1.160 at 15°/15° C., a boiling point of 134.5° C. at 2 millimeters, and a phenol coefficient of 33. 4-cyclohexyl-2,6-dichloro-phenol, prepared according to the method above outlined, using chlorine as a halogenating agent, has a boiling point of 165° C. at 2 millimeters and a freezing point of 53° C.

Example 2

I have treated 200 grams (0.97 mol.) of 4-tertiary octyl phenol with chlorine at a temperature of 60°–110° C. until 0.97 mol. of hydrogen chloride was evolved. The reaction product was then fractionally distilled and 181.5 grams of 2-chloro-4-tertiary octyl phenol, a 78 per cent of theoretical yield, was recovered. The boiling point of the compound is 145°–150° C. at 5–6 millimeters of mercury pressure absolute. The specific gravity at 25° C./25° C. is 1.055. Analysis of the compound for chlorine gave 15.01 per cent of halogen which is very close to the theoretical percentage of 15.00. The phenol coefficient of the compound is 8.0.

*Example 3*

In the preparation of this compound I treated 348 grams (1.22 mols) of 2-bromo-4-tertiary octyl phenol, at a temperature of 80°–100° C., with 195 grams (1.22 mols) of bromine. The yield of dibromo-compound was 324.5 grams or 73 per cent of theoretical. The boiling point of this compound is 158°–163° C. at 3–6 millimeters of mercury pressure absolute. The specific gravity of the material is 1.455 at 25° C./25° C. Analysis for percentage of bromine showed 44.29 per cent present as compared with a theoretical percentage of 44.00. The phenol coefficient of the compound is 8.0.

The above-described process is also applicable in the preparation of the halogen derivatives of the 4-alkyl phenols having more than 5 carbon atoms in the substituting alkyl group, wherein the alkyl group is a normal or secondary group.

The phenol coefficients given for the above compounds were determined against *E. typhi* by the method developed by the United States Public Health Service Hygienic Laboratory, as described in Circular Number 198 of the Food and Drug Administration, United States Department of Agriculture.

This application is a division of my prior applications Serial Number 655,086, filed 3 February 1933; and Serial Number 750,598, filed 29 October 1934.

Other modes of applying the principle of my invention may be employed instead of those explained, change being made as regards the materials employed, provided the step or steps recited in the following claims be carried out.

I therefore particularly point out and distinctly claim as my invention:

1. The process of producing compounds having high phenol coefficients comprising the treatment of a 4-alkyl phenol, having more than five carbon atoms in the alkyl group, with a reagent capable of introducing a halogen substituent in place of one of the hydrogen atoms.

2. The process of producing compounds having high phenol coefficients comprising the treatment of a 4-alkyl phenol, having more than five carbon atoms in the alkyl group, with a reagent capable of replacing one of the hydrogen atoms of the benzene ring by a halogen substituent.

LINDLEY E. MILLS.